UNITED STATES PATENT OFFICE.

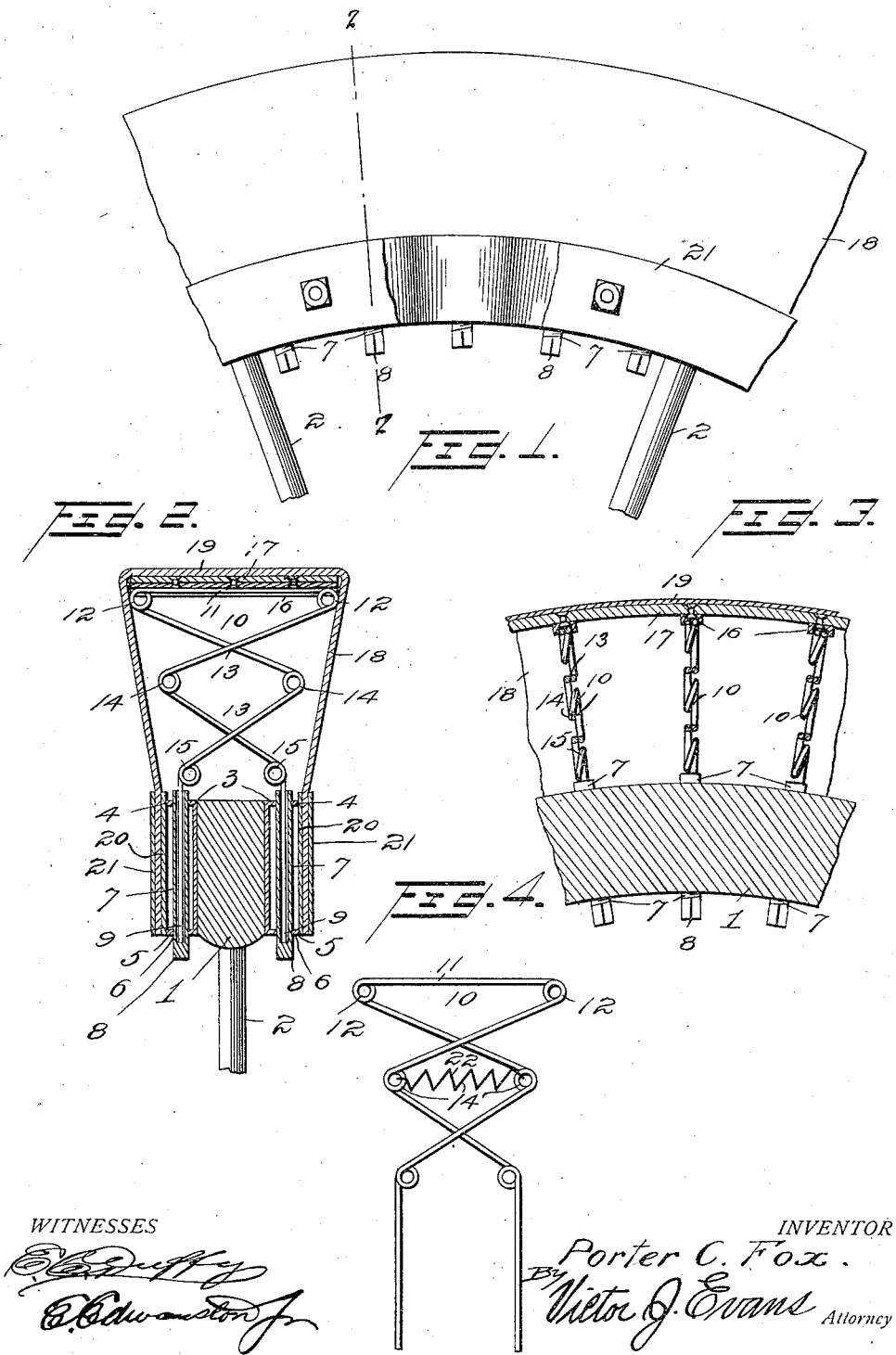

PORTER C. FOX, OF SPOKANE, WASHINGTON, ASSIGNOR TO THE FOX COMPANY, INC., OF SPOKANE, WASHINGTON, A CORPORATION OF WASHINGTON.

SPRING-TIRE.

1,065,795. Specification of Letters Patent. Patented June 24, 1913.

Application filed January 24, 1912. Serial No. 673,007.

*To all whom it may concern:*

Be it known that I, PORTER C. FOX, a citizen of the United States, residing at Spokane, in the county of Spokane and State of Washington, have invented new and useful Improvements in Spring-Tires, of which the following is a specification.

This invention relates to tires and the principal object of the invention is to provide a simple, cheap and efficient substitute for the ordinary pneumatic tire now in use.

A further object of the invention is to provide a tire which is constructed of a plurality of springs so connected to the rim sections that their tension may be increased or decreased to produce a similar effect to the inflation or deflation as the pneumatic tire.

Further objects of this invention will appear as the following specific description is read in connection with the accompanying drawing, which forms a part of this application, and in which:—

Figure 1 is a side elevation with parts broken away. Fig. 2 is a transverse section on the line 2—2 of Fig. 1. Fig. 3 is a detail longitudinal sectional view. Fig. 4 is a detail section showing the modification.

Referring more particularly to the drawing, 1 represents the felly of an ordinary wheel which is connected to the hub, not shown, by spokes 2 in the usual manner. Independently secured to opposite sides of the felly are the rim members 3 which may be secured to the felly in single units or in a plurality of sections, as is found most desirable. The rim members 3 are each provided with outwardly extending flanges 4 and 5 at their outer and inner edges, which flanges are provided with coincident apertures 6 adapted to receive supporting tubes 7. The apertures 6 in the flanges 4 are threaded and the tubes 7 are externally threaded adjacent their upper end so as to adjustably enter the apertures in the flange. The lower ends of the tubes are closed as shown at 8 so as to form abutments for the ends 9 of the tire springs 10. These tire springs consist of a single strand of spring wire having a wide outer stretch 11 which terminates in coils 12. The remaining portions of the strand between the loops 12 and the terminal ends 9 are crossed and recrossed, as shown at 13, the intermediate portion between the crosses being provided with spring loops 14 and a similar spring loop 15 being provided immediately adjacent the terminals 9 in each side of the strand.

The tread stretches 11 of each spring are removably mounted in clips or cleats 16 carried by an endless tread band 17 preferably formed of heavy leather and having a width equal to the widest portion of the springs. Covering this band and the springs is a jacket or casing 18 which preferably has its tread portion 19 formed of roughened material or is so constructed to prevent skidding of the vehicle. The sides of the casing are made sufficiently flexible and are secured along side of the rim sections between plates 20 and 21, both of which are corrugated and the former of which is secured directly to the rim flanges 4 and 5. The plate which is in the form of an annular ring either extends entirely around the rim in a single piece or sections and is secured to the inner plate by bolts or other suitable fastening means.

In the modification shown in Fig. 4, the coils 14 on opposite sides of the spring are connected together by a heavy coil spring 22 which assist in preventing the coils 14 from spreading apart, thereby increasing the strength of the spring and adding to its life.

In assembling the device, the rim sections 3 are secured upon opposite sides of the felly with their tubes in position therein. The terminal ends 9 of the springs are inserted in the tubes and the tread band 17 is placed over the springs with the clips or cleats thereon engaged with the tread strands 11. The casing is then placed over the band and springs and its sides clamped into engagement with the rim sections to properly tension the springs.

What I claim as new is:—

1. A device of the character described comprising a felly, rim members attached to the sides of said felly, threaded cup-like devices adjustably arranged in said rim members, transversely extending springs having their terminals mounted in the cup-like devices, a tread member surrounding the springs, and transverse channeled devices carried by the tread member for holding and spacing the springs apart, said transverse channeled devices being in alinement with said adjustable cup-like devices.

2. A device of the character described comprising a felly, rim members mounted on opposite faces of said felly, each rim member having an interior and exterior face member with connecting flanges at their inner and outer edges, said connecting flanges supporting in threaded adjustment cup-like devices for holding the terminals of wire springs, coiled springs with crossed and recrossed strands and straight terminal strands seated in said cup-like devices, and a jacket or casing covering said springs and devices, having its end portions locked against the exterior face members of said rim members.

In testimony whereof I affix my signature in presence of two witnesses.

PORTER C. FOX.

Witnesses:
W. G. LITSEY,
Z. A. PFILE.

Copies of this patent may be obtained for five cents each, by addressing the "Commissioner of Patents, Washington, D. C."